United States Patent
Lee

(10) Patent No.: US 8,116,778 B2
(45) Date of Patent: Feb. 14, 2012

(54) METHOD AND SYSTEM FOR CONTROLLING A PLURALITY OF TRANSMITTERS

(75) Inventor: Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 787 days.

(21) Appl. No.: 11/637,746

(22) Filed: Dec. 13, 2006

(65) Prior Publication Data

US 2007/0135130 A1 Jun. 14, 2007

(30) Foreign Application Priority Data

Dec. 14, 2005 (JP) ................................. 2005-360505

(51) Int. Cl.
*H04W 72/00* (2009.01)
(52) U.S. Cl. ................. 455/450; 455/522; 370/329
(58) Field of Classification Search .............. 455/45, 455/517, 436, 69, 450, 522; 370/329, 328
See application file for complete search history.

(56) References Cited

U.S. PATENT DOCUMENTS

| | | | |
|---|---|---|---|
| 5,493,569 A | 2/1996 | Buchholz et al. | |
| 6,154,659 A * | 11/2000 | Jalali et al. | 455/522 |
| 6,757,548 B1 * | 6/2004 | Dorenbosch | 455/517 |
| 6,781,972 B1 * | 8/2004 | Anderlind et al. | 370/329 |
| 6,885,867 B2 * | 4/2005 | Matsuoka | 455/436 |
| 7,079,507 B2 | 7/2006 | Toskala et al. | |
| 7,315,527 B2 * | 1/2008 | Wei et al. | 370/328 |
| 2003/0236103 A1 | 12/2003 | Tamaki et al. | |
| 2004/0196870 A1 | 10/2004 | Cheng et al. | |
| 2005/0041618 A1 | 2/2005 | Wei et al. | |
| 2005/0245278 A1 * | 11/2005 | Vannithamby et al. | 455/522 |
| 2005/0266854 A1 * | 12/2005 | Niiho et al. | 455/445 |
| 2005/0277419 A1 * | 12/2005 | Takano et al. | 455/442 |
| 2006/0067443 A1 * | 3/2006 | Liu et al. | 375/347 |
| 2006/0104240 A1 * | 5/2006 | Sebire et al. | 370/329 |

FOREIGN PATENT DOCUMENTS

| | | |
|---|---|---|
| JP | 2003-092582 | 3/2003 |
| JP | 2004-7030 (A) | 1/2004 |
| JP | 2004-032015 | 1/2004 |
| JP | 2004-312739 | 11/2004 |
| WO | WO 94/21063 | 9/1994 |
| WO | WO 01/63951 A2 | 8/2001 |
| WO | WO 2005/018270 A2 | 2/2005 |

OTHER PUBLICATIONS

3GPP TS 25.309 V6.3.0 (Jun. 28, 2005) Technical Specification $3^{rd}$ Generation Partnership Project; Technical Specification Group Radio Access Network; FDD Enhanced Uplink; Overall description; Stage 2 (Release 6), pp. 1-33.
3GPP TR 25.808 V6.0.0 (Mar. 29, 2005) Technical Report, $3^{rd}$ Generation Partnership Project; Technical Group Radio Access Network; FDD Enhanced Uplink; Physical Layer Aspects (Release 6); pp. 1-26.

* cited by examiner

*Primary Examiner* — Lana N Le
*Assistant Examiner* — Golam Sorowar
(74) *Attorney, Agent, or Firm* — Foley & Lardner LLP

(57) ABSTRACT

Mobile station transmits a scheduling request message to base station to request a grant for transmitting packets in a cellular mobile communication network. Base station transmits at least a deactivation scheduling grant message to mobile station to deactivate packet transmission of mobile station. Mobile station fails to receive the first grant message but successfully receives the second grant message. Upon receiving a scheduling grant confirmation message responding the second grant message from mobile station, base station transmits an activation scheduling grant message to mobile station.

54 Claims, 9 Drawing Sheets

RF:RELIABILITY FACTOR

METHOD AND SYSTEM FOR CONTROLLING A PLURALITY OF TRANSMITTERS

BACKGROUND OF THE INVENTION

1. Field of the Invention

The present invention relates to a method and system for controlling a plurality of transmitters and, particularly, to a method and system for controlling a plurality of transmitters in a cellular mobile communication network.

2. Description of the Related Art

In typical cellular mobile communication network, a mobile station sends uplink packets, such as an uplink data packet, to a base station over the air and the base station forwards the received packets toward an appropriate upper layer, e.g. the Internet. To support efficient uplink packet transmission from multiple mobile stations in the cellular mobile communication network, the base station schedules the multiple mobile stations in order to maximize the total uplink data throughput in the cell while meeting a service requirement of individual mobile station.

As an example uplink packet scheduling system, FIG. 1 illustrates the Enhanced Uplink Dedicated Channel (EUDCH) system. In EUDCH, the mobile stations 101-1 and 101-2 are exchanging control messages with the base station 102 such as scheduling request message in uplink and scheduling grant message in downlink. A base station scheduler (i.e., a scheduler in the base station 102) assigns radio resource by transmitting scheduling grant messages while the mobile station can request the resource by transmitting scheduling request message (see 3GPP TS 25.309 V6.3.0 (2005 Jun. 28) Technical Specification 3rd Generation Partnership Project; Technical Specification Group Radio Access Network; FDD Enhanced Uplink; Overall description; Stage 2 (Release 6) and 3GPP TR 25.808 V6.0.0 (2005 Mar. 29) Technical Report 3rd Generation Partnership Project; Technical Specification Group Radio Access Network; FDD Enhanced Uplink; Physical Layer Aspects (Release 6)).

One of problems of conventional technology of the Interest, such as EUDCH technology, is that a collision of packet transmission can occur when a mobile station fails to receive a scheduling grant message sent by the base station scheduler. An illustration of aforementioned problem is shown in FIG. 2. In this example, the base station 102 is scheduling two mobile stations. Initially, the mobile station 101-1 is transmitting its packets, and then the mobile station 101-2 requests for transmission. The base station scheduler decides to halt the packet transmission from the mobile station 101-1 in order to start packet transmission from the mobile station 101-2. However, a deactivation scheduling grant message for the halt sent to the mobile station 101-1 is failed to be received by the mobile station 101-1, while an activation scheduling grant message sent to the mobile station 101-2 is successfully received by the mobile station 101-2. Then, the data transmissions of the two mobile stations 101-1 and 101-2 collide each other as soon as mobile station 101-2 starts its transmission.

In the example illustrated above, the mobile station 101-1 fails to receive the deactivation scheduling grant message due to hazardous downlink wireless channel condition or the like. In typical scenario of a large number of scheduled mobile stations and the unpredictable wireless channel condition of each mobile station, a perfect reception of scheduling grant message is non trivial task. Then, as a result of miss reception of the deactivation scheduling grant message, the data transmission of respective mobile stations collide each other which then results in the loss of transmitted data.

In the example illustrated above, the base station 102 could send the activation scheduling grant message to the mobile station 101-2 after detecting that the mobile station 101-1 has stopped its transmission. In this way, it could be possible to avoid the packet collision between the two mobile stations. However, the base station has to detect the mobile station 101-1 stopped its transmission before it sends activation scheduling grant message to mobile station 101-2. In order to allow the detection, there should be a time period when none of two mobile stations are transmitting data packets. And hence this would create another problem of resource under utilization during the transition period.

SUMMARY OF THE INVENTION

An objective of the present invention is to provide a method and system for controlling a plurality of transmitters for avoiding the packet transmission collision in case of non-perfect reception of a scheduling grant message and allowing full radio resource utilization.

According to the present invention, there is provided a method for controlling a plurality of transmitters, at least one of which transmits packets to a receiver, said controlling being made by sending at least one message to said at least one of said plurality of transmitters from a controller, said method comprising the steps of determining reliability of said message; and sending said message to a target transmitter with the determined reliability.

In the above method, in the step of determination, higher reliability may be set to a deactivation scheduling grant message than reliability set to an activation scheduling grant message.

In the above method, in the step of determination, higher reliability may be set to a rate-decrease scheduling grant message than reliability set to a rate-increase scheduling grant message.

In the above method, in the step of determination, said reliability may be determined depending on amount of increase or decrease of said data transmission rate.

In the above method, said reliability may comprise at least one of factors including a code gain of said message, the number of transmission antennas of said message, and the number of repetitions of sending said message, and in the step of determination, at least one of said factors may be set greater for said message which should be sent with higher reliability than said one of said factors for said message which should be sent with lower reliability.

In the above method, in the step of determination, higher reliability may be set to a scheduling grant message having higher seriousness than reliability set to an scheduling grant message having lower seriousness.

The above method may further comprise the steps of: causing the step of sending said message in order to send a rate-decrease scheduling grant message toward said target transmitter from said controller; said target transmitter may receive said rate-decrease scheduling grant message; said target transmitter may send a scheduling grant confirmation message to said controller; and said target transmitter may decrease said data transmission rate when a period elapses after receiving said rate-decrease scheduling grant message.

The above method may further comprise the steps of: causing the step of sending said message in order to send a rate-increase scheduling grant message toward said target transmitter from said controller; said target transmitter receives said rate-increase scheduling grant message; and said target transmitter increases said data transmission rate when a period elapses after receiving said rate-increase scheduling grant message.

The above method may further comprise the steps of causing the step of sending said message in order to send a rate-increase scheduling grant message toward said target transmitter from said controller; said target transmitter receives said rate-increase scheduling grant message; and said target transmitter increases said data transmission rate just after receiving said rate-increase scheduling grant message.

The above method may further comprise the steps of: causing the step of sending said message in order to send a deactivation scheduling grant message directed to a first target transmitter from said controller; said first target transmitter receives said deactivation scheduling grant message; said first target transmitter sends a scheduling grant confirmation message to said controller after receiving said deactivation scheduling grant message; said first target transmitter halts transmitting packets when a first period elapses after receiving said deactivation scheduling grant message; said controller receives said scheduling grant confirmation message; causing the step of sending said message in order to send an activation scheduling grant message directed to a second target transmitter from said controller after said controller receives said scheduling grant confirmation message; said second target transmitter receives said activation scheduling grant message; and said second target transmitter starts to transmit packets when a second period elapses after receiving said activation scheduling grant message.

In the above method, a deactivation time when said first target transmitter halts transmitting packets may be the same as an activation time when said second target transmitter starts to transmit packets.

The above method may further comprise the steps of: attaching information representing said first period corresponding to said deactivation time to said deactivation scheduling grant message; and attaching information representing said second period corresponding to said activation time to said activation scheduling grant message.

In the above method, said first period may be predetermined, and the above method may further comprise the step of calculating the second period based on the transmission time of said deactivation scheduling grant message which is successfully received by said first target transmitter, said first period, and the transmission time of said activation time.

The above method may further comprise the steps of: repeating the step of causing the step of sending said message in order to send a deactivation scheduling grant message directed to said first target transmitter from said controller until said controller receives said scheduling grant confirmation message.

The above method may further comprise the steps of: repeatedly causing the step of sending said message in order to send a deactivation scheduling grant message directed to a first target transmitter from said controller; said first target transmitter receives at least one of the deactivation scheduling grant messages; said first target transmitter halts transmitting packets when a first period elapses after receiving said one of the deactivation scheduling grant messages; causing the step of sending said message in order to send an activation scheduling grant message directed to a second target transmitter from said controller; said second target transmitter receives said activation scheduling grant message; and said second target transmitter starts to transmit packets when a second period elapses after receiving said activation scheduling grant message.

In the above method, a deactivation time when said first target transmitter halts transmitting packets may be the same as an activation time when said second target transmitter starts to transmit packets.

The above method may further comprise the steps of: attaching information representing said first period corresponding to said deactivation time to said deactivation scheduling grant message; and attaching information representing said second period corresponding to said activation time to said activation scheduling grant message.

In the above method, said deactivation time may be predetermined, and the above method may further comprise the step of calculating the first period for each of the deactivation scheduling grant messages based on the transmission time of each of the deactivation scheduling grant messages and said deactivation time.

In the above method, the step of causing the step of sending said message in order to send an activation scheduling grant message directed to a second target transmitter from said controller may be executed repeatedly.

In the above method, the number of occurrences of causing the step of sending said message in order to send the deactivation scheduling grant message directed to the first target transmitter from said controller may be greater than the number of occurrences of causing the step of sending said message in order to send the activation scheduling grant message directed to the second target transmitter from said controller.

In the above method, the method may be applied to a cellular mobile communication network, each of said plurality of transmitters is included in each of a plurality of mobile stations in said cellular mobile communication network, and said receiver and said controller are included in a base station in said cellular mobile communication network.

The present invention provides a scheduling method avoiding the packet transmission collision in case of non-perfect reception of a scheduling grant message as well as allowing full radio resource utilization. As illustrated in FIG. 6, a collision between packets transmitted from the first mobile station and packets transmitted from the second mobile station can be avoided while the radio resource is used by either one of the mobile stations in the presence of non-perfect reception of a scheduling grant message.

DETAILED DESCRIPTION OF THE PREFERRED EMBODIMENT

The best modes of embodiment according to the present invention will be described with reference to the accompanying drawings.

First Embodiment

Figure 3:
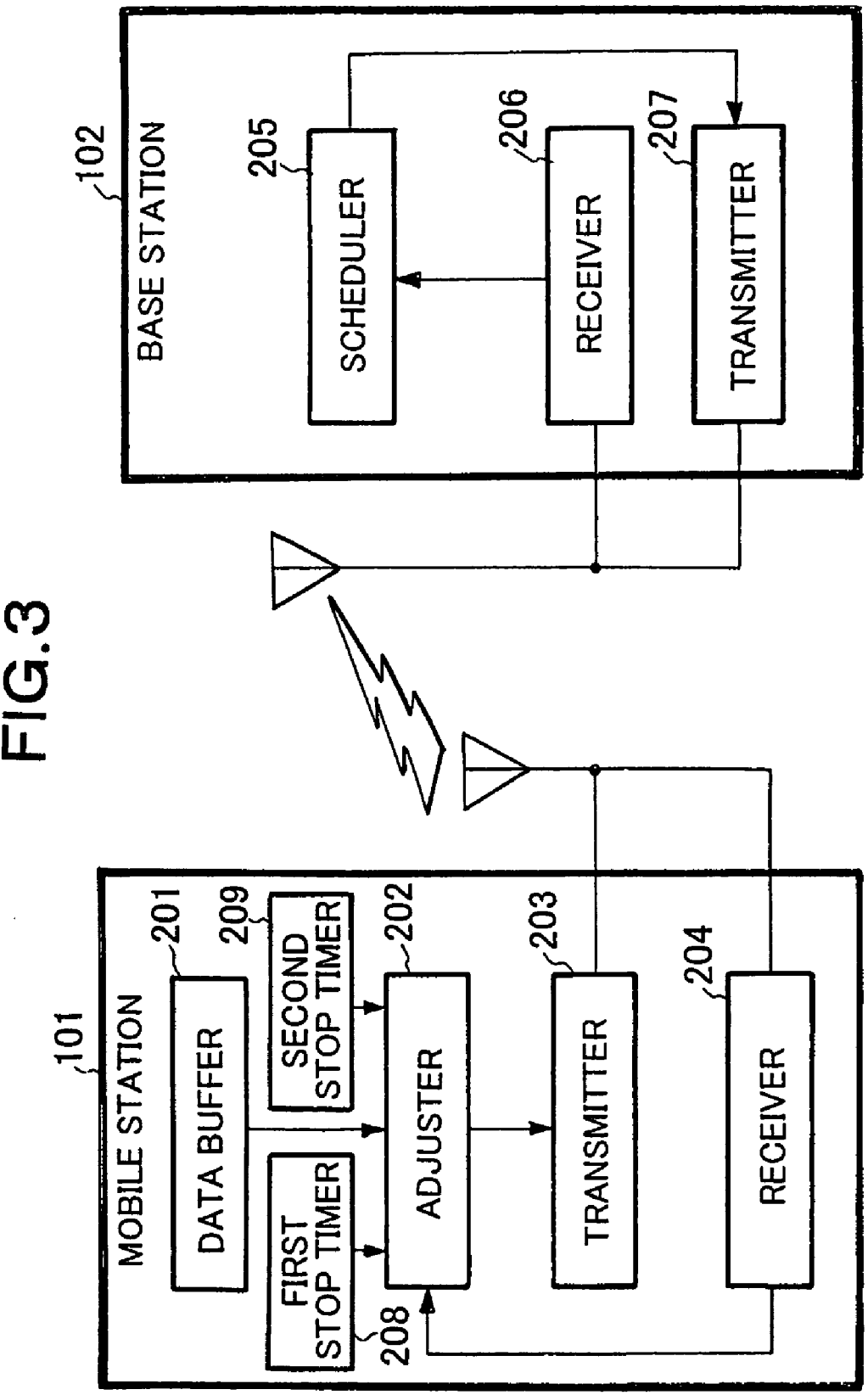
FIG. 3 is a block diagram showing the structure of a part of a mobile station and the structure of a part of the base station according to the embodiments of the present invention.

FIG. 3 illustrates a system comprising a plurality of mobile stations 101 which are connected to a base station 102. Though, only one mobile station 101 is illustrated in FIG. 3, other similar mobile stations 101 not shown are also connected to the base station 102. The mobile station 101 transmits packets to the base station 102.

Data buffer 201 stores packets to be transmitted to the base station 102. The adjuster 202 supplies packets stored in the data buffer 201 when sending the packets to the base station 102 is activated. Transmitter 203 sends the packets supplied from the adjuster 202 to the base station 102 and sends messages, such as a scheduling request message, a scheduling grant confirmation message, to the base station 102. The transmission rate of the packets from the mobile station 101 is controlled by the base station 102 by scheduling grant messages from the base station 102. Receiver 204 receives messages, such as an activation scheduling grand message, a deactivation scheduling grant message, a rate-increase scheduling grant message, and a rate-decrease scheduling grant message, from the base station 102.

The first stop timer 208 corresponds to an activation time, and counts a count corresponding to an activation time-waiting period. The activation time-waiting period starts at the time when the mobile station 101 receives an activation scheduling grant message from the base station 102 and ends at the activation time. When the activation time arrives, the first stop timer 208 stops, and the mobile station 101 starts to transmit packets to the base station 102.

The second stop timer 209 corresponds to a deactivation time, and counts a count corresponding to a deactivation time-waiting period. The deactivation time-waiting period starts at the time when the mobile station 101 receives a deactivation scheduling grant message from a base station 102 and ends at the deactivation time. When the deactivation time arrives, the second stop timer 209 stops, and the mobile station 101 stops transmitting packets.

If the count corresponding to the activation time-waiting period is stored inside the mobile station 101, then no information on the count needs to be sent from the base station 102. On the other hand, if the count corresponding to the activation time-waiting period is not stored inside the mobile station 101, then information on the count needs to be sent from the base station 102. The same holds for the count corresponding to the deactivation time-waiting period.

When a mobile station 101 receives an activation scheduling grant message, the first stop timer 208 starts. When the mobile station 101 receives a deactivation scheduling grant message, the second stop timer 209 starts. In addition, no deactivation scheduling grant message is sent to the mobile station 101 while the first stop timer 208 in that mobile station 101 is operated. Similarly, no activation scheduling grant message is sent to the mobile station 101 while the second stop timer 209 in that mobile station 101 is operated. Therefore, there is no situation where the first stop timer 208 and the second stop timer 209 are operated simultaneously. Thus, if information on each count is sent from the base station 102, then a single stop timer having a function of loading the count, sent from the base station 102, as an initial value operates as both of the first and second stop timers 208 and 209. Further, even if the count corresponding to the activation time-waiting period and the count corresponding to the deactivation time-waiting period are stored inside the mobile station 101, a single stop timer having a function of loading the count, inside the mobile station 101, as an initial value operates as both of the first and second stop timers 208 and 209.

The scheduler 205 schedules packet transmission of a plurality of mobile stations 101. Receiver 206 receives the packets and the messages transmitted from the transmitter 203. Transmitter 207 transmits the messages to be received by the receiver 204. Base station 102 is a type of a controller in the meaning that it controls the packet transmission of a plurality of mobile stations 101.

Figure 4:
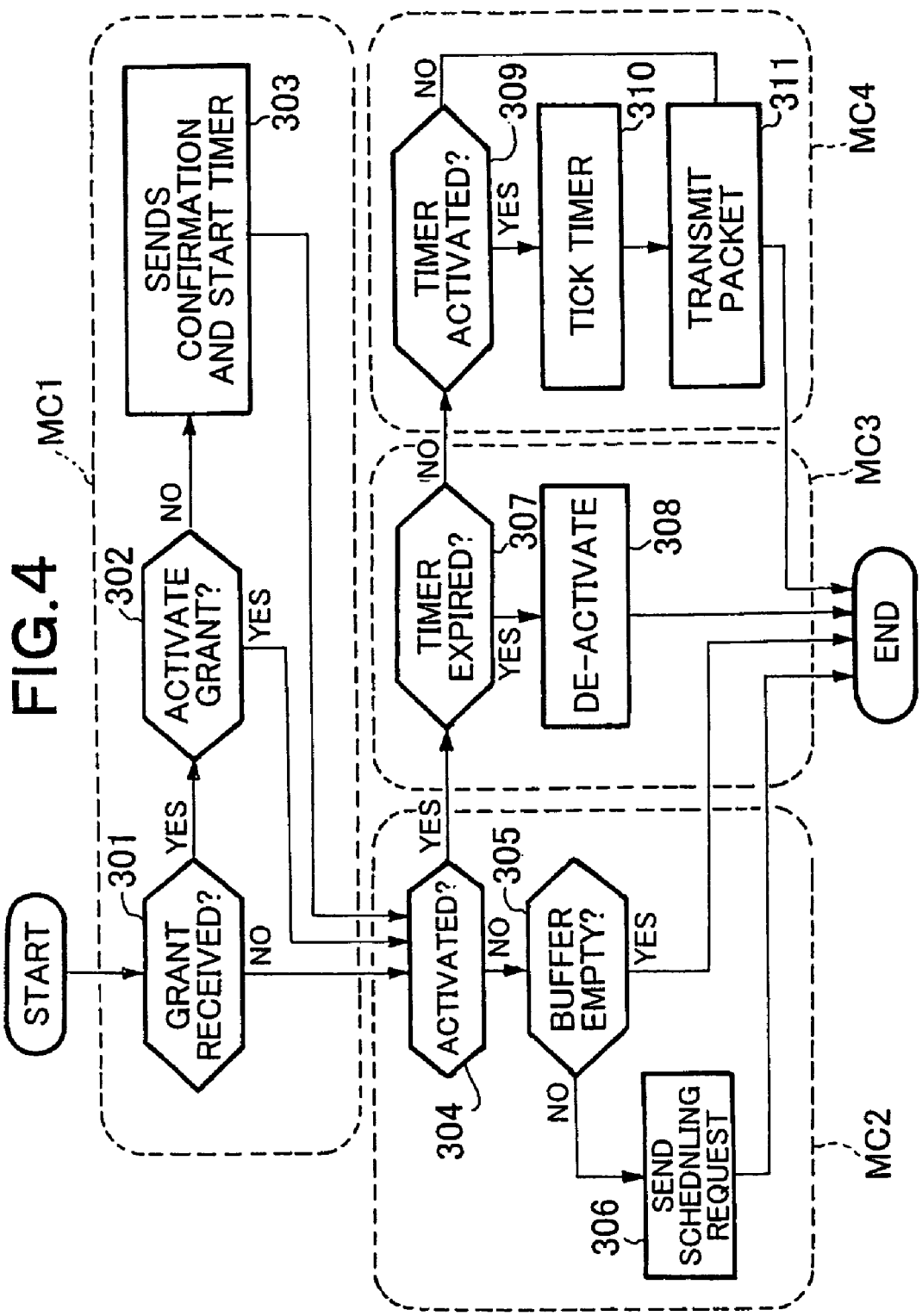
FIG. 4 is a flow diagram showing the operation of the mobile station according to the first embodiment of the present invention.

FIG. 4 shows a detailed procedure of the mobile station 101, which can be realized by a hardware, a software or the combination of them. Here, realizing the procedure by the software means having a CPU read from a computer-readable media and execute a program comprising codes for executing the steps of the procedure. The steps are as follows:

[MC1] If a de-activation scheduling grant message is received (301:YES and 302:NO), the mobile station 101 sends a scheduling grant confirmation message responding to the de-activation scheduling grant message and starts a stop timer 209 which will continue counting until the deactivation time designated by the base station 102 (303) and;

[MC2] If not receiving the de-activation scheduling grant message (301:NO or 301:YES and 302:YES) and the mobile station 101 is currently de-activated (304:NO) and a buffer for temporally storing packets to be transmitted is not empty (305:NO), the mobile station 101 transmits a scheduling request message which including buffer size and channel quality information to the base station 102 (306) and;

[MC3] If the mobile station 101 is currently activated (304:YES) and the stop timer 209 has been expired (307:YES), the mobile station 101 deactivates the packet transmission (308) and;

[MC4] If the mobile station 101 is currently activated (304:YES) and the stop timer 209 is not expired (307:NO) and the stop timer 209 is activated (309:YES), the mobile station 101 counts up the stop timer 209 (310) and then transmits the buffered packets to the base station 102 (311).

[MC4] If the mobile station 101 is currently activated (304:YES) and the stop timer 209 is not expired (307:NO) and the stop timer 209 is not activated (309:NO), step 310 is skipped and the mobile station 101 transmits the buffered packets to the base station 102 (311).

Figure 5:
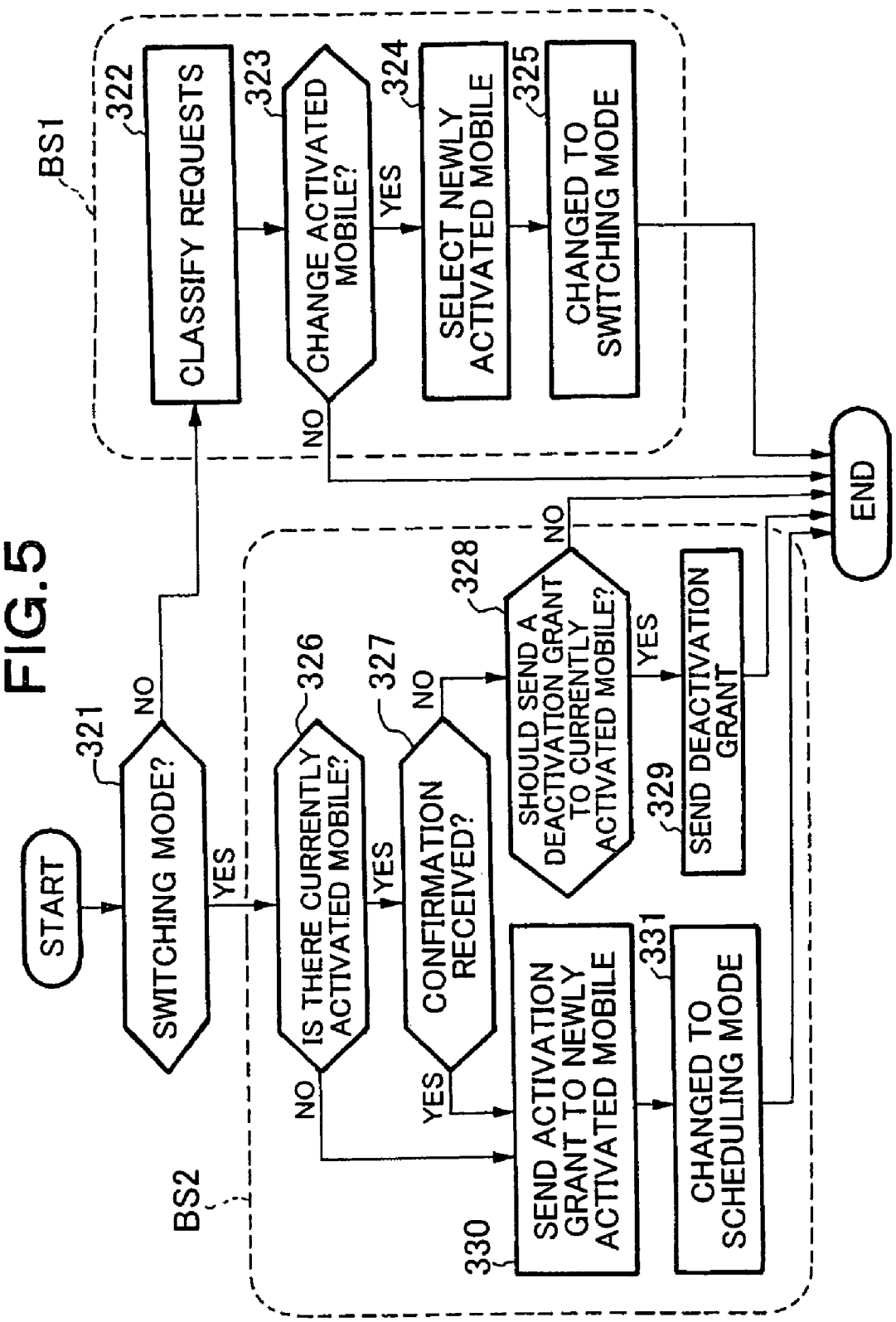
FIG. 5 is a flow diagram showing the operation of the base station according to the first embodiment of the present invention.

FIG. 5 shows a detailed procedure of the base station 102, which can be realized by a hardware, a software or the combination of them. Here, realizing the procedure by the software means having a CPU read from a computer-readable media and execute a program comprising codes for executing the steps of the procedure. The steps are as follows:

[BS1] In a scheduling mode (321:NO),

The base station 102 receives scheduling requests from mobile stations and;

perform the scheduling (322)

If the base station 102 decides to change an activated mobile station 101, the base station 102 selects a newly activated mobile station (323:YES, 324, 325) and is changed to a switching mode (325);

If the base station 102 decides to keep currently activated mobile stations 101 as activated mobile stations (323:NO) the base station 102 stays in the scheduling mode;

[BS2] In the switching mode (321:YES),

The base station 102 sends a deactivation scheduling grant message to one of currently activated mobile stations 101 (326:YES, 327:NO, 328:YES, 329) and;

The base station 102 waits for a scheduling grant confirmation message responding to the deactivation scheduling grant message, from the currently activated mobile station to be deactivated (326:YES, 327) and;

If the a scheduling grant confirmation message is received (327:YES), the base station 102 sends an activation scheduling grant message to the mobile station 101 which will be newly activated, wherein the activation time is equal to the deactivation time of the currently activated mobile station to be deactivated (330). And the base station 102 is changed to the scheduling mode (331)

If the scheduling grant confirmation message responding to the deactivation scheduling grant message is not received within a pre-defined time interval (327:NO), the base station 102 sends again the deactivation scheduling grant message to the currently activated mobile station to be deactivated (328:YES, 329).

The following is an explanation in a case where the mobile station 101 starts to transmit packets just after receiving an activation scheduling grant message and stops transmitting packets when a deactivation time arrives after receiving a deactivation scheduling grant message, and hence only the stop timer 209 for the deactivation time-waiting period is needed and the stop timer 208 is needless. When the mobile station receives the deactivation scheduling grant message, the stop timer 209 is changed from the deactivated state to the activated state and starts counting up from zero. Thereafter, when the deactivation time comes, the stop timer 209 stops counting at the count corresponding to the period from the time of receiving the deactivation scheduling grant message to the deactivation time, the stop timer 209 is changed from the activated state to the deactivated state and the stop timer 209 is changed from the non-expired state to the expired state. Thereafter, when the mobile station receives the activation scheduling grant message at the activation time, the stop timer 209 is changed from the expired state to the non-expired state. Therefore, the stop timer 209 is activated during a period from the time of receiving the deactivation message to the deactivation time, i.e. while counting up. And the stop timer 209 is deactivated during the other period. In addition, the stop timer 209 is expired during a period from the deactivation time to the following activation time. And the stop timer 209 is not expired during a period from the activation time to the following deactivation time. The packet transmission is executed when the stop timer 209 is not expired.

In a case where the mobile station 101 starts to transmit packets when an activation time arrives after receiving an activation scheduling grant message and stops transmitting packets when a deactivation time arrives after receiving a deactivation scheduling grant message, both of the stop timers 208 and 209 are needed, or a single stop timer operating as the stop timers 208 and 209 at different periods is needed. However, the operation of the stop timers 208 and 209 in this case is already described in introductory description of the timers. As supplemental description, a pulse signal representing the activation time when the first stop timer 208 stops may be used as a trigger for starting packet transmission, and a pulse signal representing the deactivation time when the second stop timer 209 stops may be used as a trigger for stopping the packet transmission.

Based on the detailed procedure described above, FIG. 6 illustrates an example of sequential procedure between the two mobile stations 101-1 and 101-2 and the base station 102 as follows:

At time instance T1, the mobile station 101-1 is transmitting its packets to the base station 102;

At time instance T2, the mobile station 101-2 sends a scheduling request to the base station 102 in order to start a data transmission (306 in FIG. 4);

At time instance T3, the base station 102 decides to stop the data transmission of mobile station 101-1 in order to allow the mobile station 101-2 to start a data transmission (323:YES in FIG. 5);

At time instance T4, the base station 102 sends a deactivation scheduling grant message to the mobile station 101-1 (329 in FIG. 5) but the mobile station 101-1 fails to receive the deactivation scheduling grant message. The deactivation time is determined by the time instance T4 and a predetermined period to be counted by the stop timer 209. That is, the deactivation time is the time when the predetermined period elapses after the time instance T4. The deactivation time attached to the deactivation scheduling grant message is not accepted by the mobile station 101-1 this time.

At time instance T5, data transmission of mobile station 101-1 continues due to the failure in the reception at time instance T4;

At time instance T5, the mobile station 101-1 keeps on transmitting its packets (329 in FIG. 5);

At time instance T6, the base station 102 detects a time-out of a scheduling grant confirmation message reception (327:NO, 328:YES in FIG. 5) and re-sends the deactivation scheduling grant message to the mobile station 101-1 (329 in FIG. 5). And the mobile station 101-1 successfully receives the deactivation scheduling grant message (301:YES, 302:NO in FIG. 4). The new deactivation time is determined by the time instance T6 and the above-mentioned predetermined period. That is, the new deactivation time is the time when the predetermined period elapses after the time instance T6. The same predetermined period, which will result in a new deactivation time, is attached to the re-sent deactivation scheduling grant message and is successfully accepted by the mobile station 101-1. In addition, the second stop timer 209 in the mobile station 101-1 is started to measure the predetermined period;

At time instance T7, the mobile station 101-1 sends a scheduling grant confirmation message to the base station 102 (303 in FIG. 4). Upon receiving the scheduling grant confirmation message, the base station 102 confirms that the re-sent deactivation scheduling grant message was successfully received by the mobile station 101-1;

At time instance T8, the base station 102 sends an activation scheduling grant message to the mobile station 101-2 (330 in FIG. 5) A second period is attached to the activation scheduling grant message. The second predetermined period will, when combined with the transmission time of the activation scheduling grant message, define an activation time of the mobile station 101-2. The first stop timer 208 in the mobile station 101-2 is started to measure the second predetermined period.

The activation time of the mobile station 101-2 is equal to the second deactivation time of the mobile station 101-1. Concretely, the activation time is detected by the first stop timer 208 counting the period from the time instance T8 to the activation time T9 in the mobile station 101-2. Therefore, the activation time attached to the activation scheduling grant message is represented by the period from the time instance T8 to the activation time T9. Therefore, the scheduler 205 calculates the period by subtracting the time instance T8 from the activation time T9, wherein the scheduler 205 also calculates the activation time T9 by adding the predetermined period attached to the deactivation scheduling grant message to the time instance, i.e. the time instance T6, of sending the deactivation scheduling grant message which was successfully received by the mobile station 101-1.

At time instance T9, i.e. the activation time of the mobile station 101-2 or the second deactivation time of the mobile station 101-1, the mobile station 101-1 stops the packet transmission (308 in FIG. 4) and the mobile station 101-2 starts its packet transmission (309 in FIG. 4).

In the detailed mobile procedure illustrated in FIG. 4, the mobile station 101-2 can transmit packets from activation time, when a predetermined period elapses after receiving activation scheduling grant message, whereas, as a general rule, the mobile station 101 should stop the transmission at predefined deactivation time after receiving deactivation scheduling grant message. This predefined deactivation time secures a period for the transmission of scheduling grant confirmation message, responding to the deactivation scheduling grant message, by the currently activated mobile station to be deactivated, and the transmission of activation scheduling grant message by the base station to a deactivated mobile station which will be newly activated.

Figure 6:
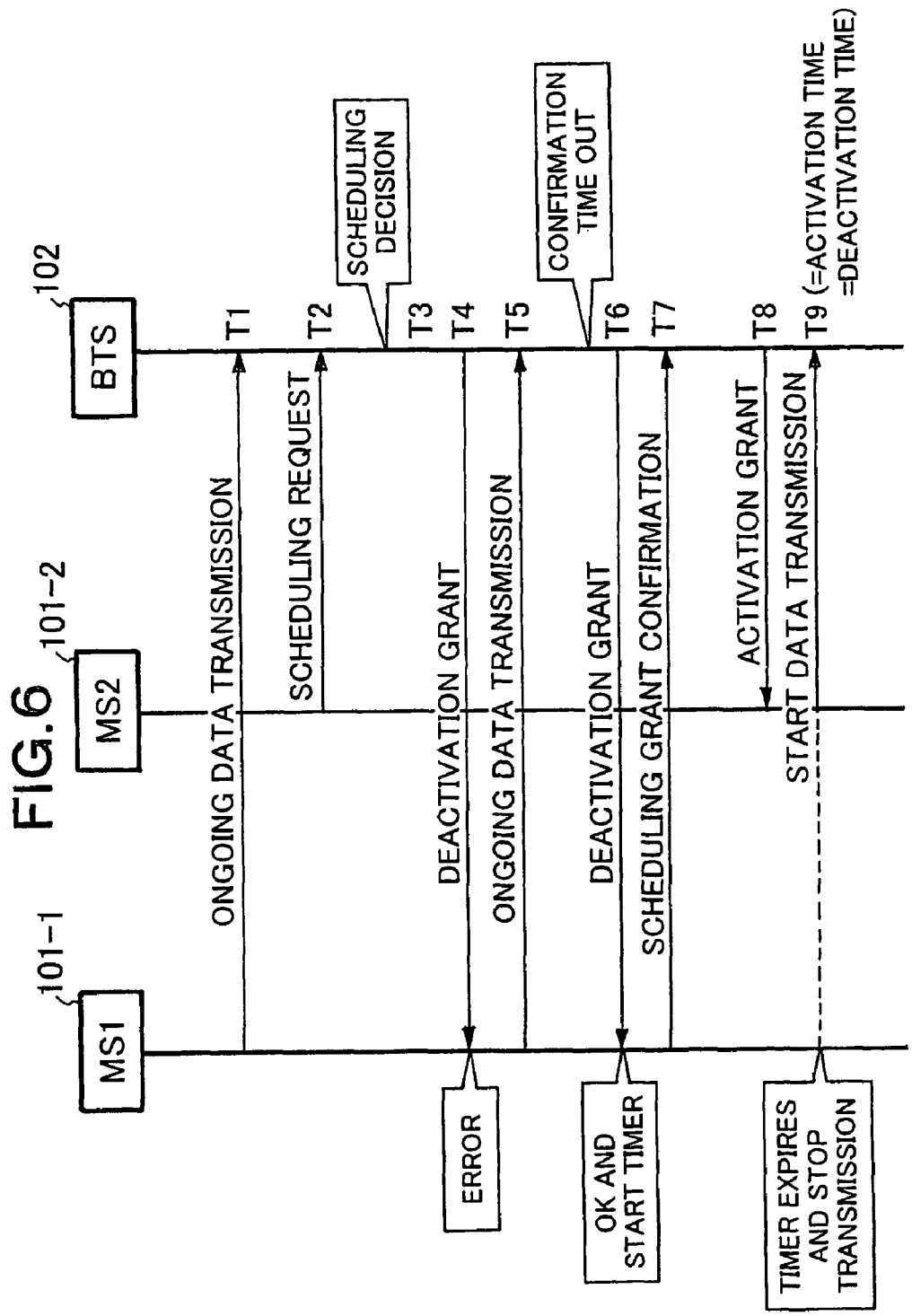
FIG. 6 is a sequence diagram showing an example of the operation of the mobile station and the base station according to the first embodiment of the present invention.

That is, as shown in FIG. 6, the period from time T6 to time T9, wherein time T9 is the deactivation time, secures time T7 when the scheduling grant confirmation message is transmitted, time T8 when the activation scheduling grant message is transmitted. The packet transmission of the mobile station 101-1 can be continued until time T9, at which the packet transmission of the mobile station 101-2 starts. Therefore, a wasteful period of no packet transmission can be avoided.

Instead of the general rule mentioned above, the activation time may be later than the deactivation time, as long as tolerating occurrence of the wasteful period of no packet transmission. However, it should be always avoid that the activation time be earlier than the deactivation time, because collision occurs in such a case.

The first embodiment may be modified so that the deactivation scheduling grant message is changed to a rate-decrease scheduling message, the activation scheduling grant message is changed to a rate-increase scheduling message, the deactivation time is changed to a rate-decrease time, and the activation time is changed to a rate-increase time.

In the first embodiment, a presently activated mobile station 101 will stop transmission when the stop timer 209 reaches the pre-determined period after reception of the deactivation scheduling grant message. The mobile station 101 uses the pre-determined period which is pre-configured by the base station before packet communication. Then the first embodiment may be modified so that the base station 102 sends an arbitrary value explicitly together with the deactivation scheduling grant message. Compared with a pre-determined period, this requires more overhead in the deactivation scheduling grant message but allows more flexibility in controlling the deactivation time of mobile station 101.

Second Embodiment

The following describes a second embodiment of the present invention.

The second embodiment is based on the system of the first embodiment as shown in FIG. 3.

The second embodiment is based on the detailed mobile station procedure in the first embodiment as shown in FIG. 4, except the following:

The mobile station 101 does not send the scheduling grant confirmation message at step 303 in FIG. 4, even when it successfully receives the deactivation scheduling grant message from the base station 102 and goes the step 304.

The mobile station 101 resets the stop timer 209 using the deactivation timing information attached to the deactivation scheduling grant message. The deactivation timing information varies depending on the transmission time of the deactivation scheduling grant message, if deactivation timing information is represented by the number of counts to be counted by the stop timer 209, in order to designate the same absolute deactivation time. The resetting the stop timer 209 using the deactivation timing information means starting the stop timer 209 to count from zero up to the count indicated by the deactivation timing information representing a deactivation time-waiting period from the time when the deactivation scheduling grant message is sent to the deactivation time. The difference between the first embodiment and the second embodiment with respect to the stop timer 209 is that in step 303, the stop counter is controlled to count up to a fixed value in the first embodiment, but up to a variable value in the second embodiment.

The second embodiment of the present invention is based on the detailed base station procedure in the first embodiment as shown in FIG. 5, except the following:

The base station 102 repeatedly transmits the deactivation scheduling grant message to the currently activated mobile station 101 which should be deactivated, without receiving the scheduling grant confirmation message, and each of the repeated deactivation scheduling grant messages contains the deactivation timing information indicating the same desired deactivation time of the mobile station 101 and Whichever deactivation scheduling grant message the mobile station 101 receives among the plurality of deactivation scheduling grant messages, the mobile station 101 receives deactivation timing information always indicating the same desired deactivation time of the mobile station 101.

Figure 7:
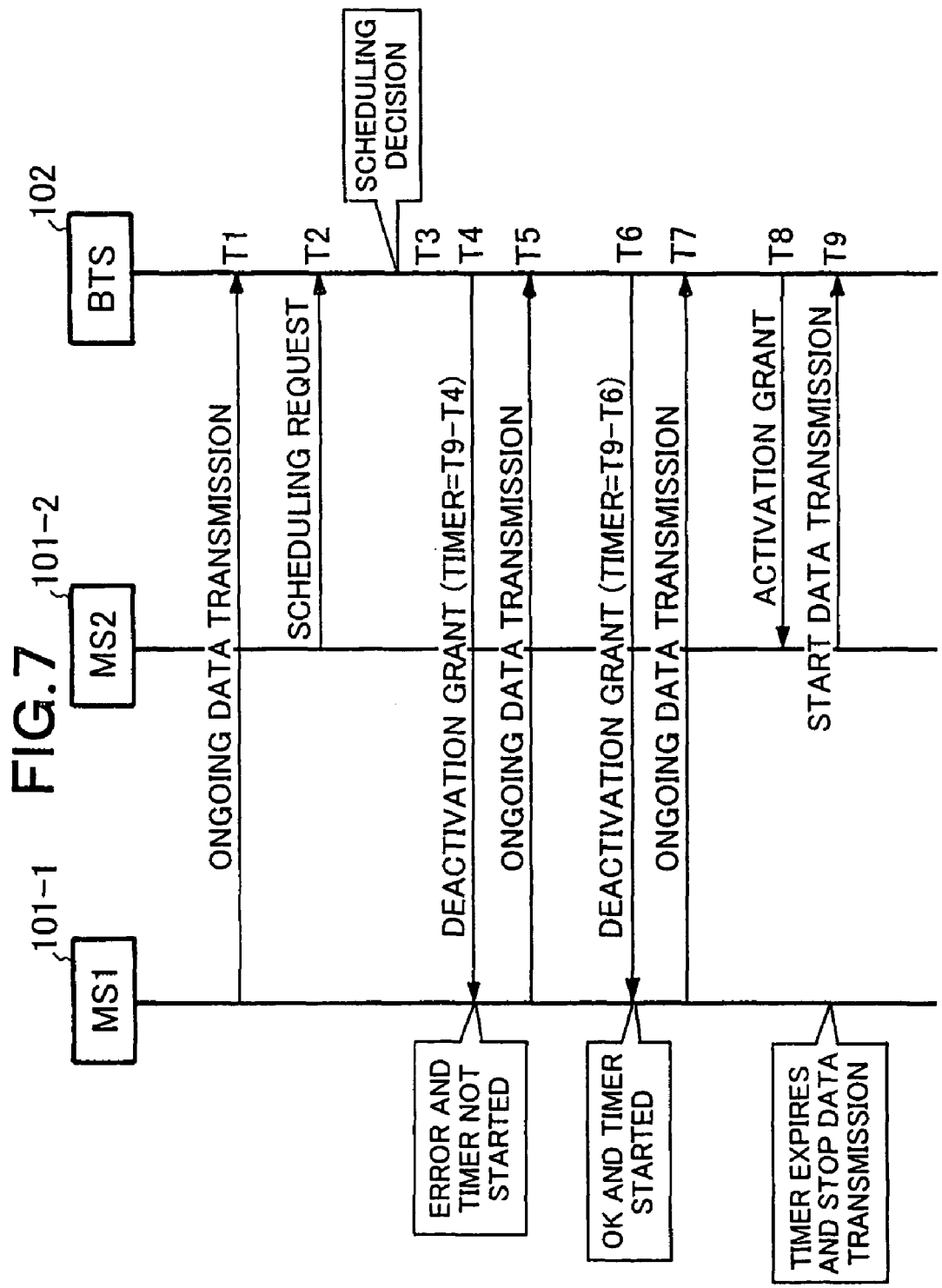
FIG. 7 is a sequence diagram showing an example of the operation of the mobile station and the base station according to the second embodiment of the present invention.

Based on the detailed procedure described above, FIG. 7 illustrates an example of sequential procedure between two mobile stations 101-1 and 101-2 and the base station 102. The sequence in FIG. 7 differs from that of FIG. 6 in particular steps as follows:

At time instance T4, the base station 102 sends a deactivation scheduling grant message to the mobile station 101-1 together with information for having the stop timer 209 count in the mobile station 101-1 from zero up to the value corresponding to the period of T9-T4 (329 in FIG. 5) but the mobile station 101-1 fails to receive the deactivation scheduling grant message and the deactivation timing information;

At time instance T6, the base station 102 sends a next deactivation scheduling grant message to the mobile station 101-1 together with information for having the stop timer 209 count from zero up to the value corresponding to the period of T9-T6 (329 in FIG. 5). The mobile station 101-1 successfully receives the second deactivation scheduling grant message and it starts the stop timer 209 which will count from zero to the count corresponding to the period of T9-T6. At time T9, when the count of the stop timer 209 reaches the count corresponding to the period of T9-T6, the transmission of packets by the mobile station 101-1 is halted. If the mobile station 101-1 could receive the first deactivation scheduling grant message, the time T9 would have be found when the count of the stop timer 209 reaches the count corresponding to the period of T9-T4 after the reception of the first deactivation scheduling grant message.

In the second embodiment, the period from the transmission time of each deactivation scheduling message to the deactivation time is calculated, while the period from the transmission time of the activation scheduling message to the activation time is predetermined, because once it is determined to change an activated mobile station, the activation time which is the same as the deactivation time and the time when sending the activation scheduling grant message is determined. However, in a case where the activation scheduling grant message is sent repeatedly, the period from the transmission time of each activation scheduling message to the activation time is determined in the similar way to that of calculating the period from the transmission time of each deactivation scheduling message to the deactivation time.

According to the second embodiment, the deactivation time is not varied depending on the time when the deactivation scheduling grant message is successfully received by the mobile station as long as the successful reception occurs before the deactivation time comes.

Third Embodiment

The following describes a third embodiment of the present invention.

Figure 8:
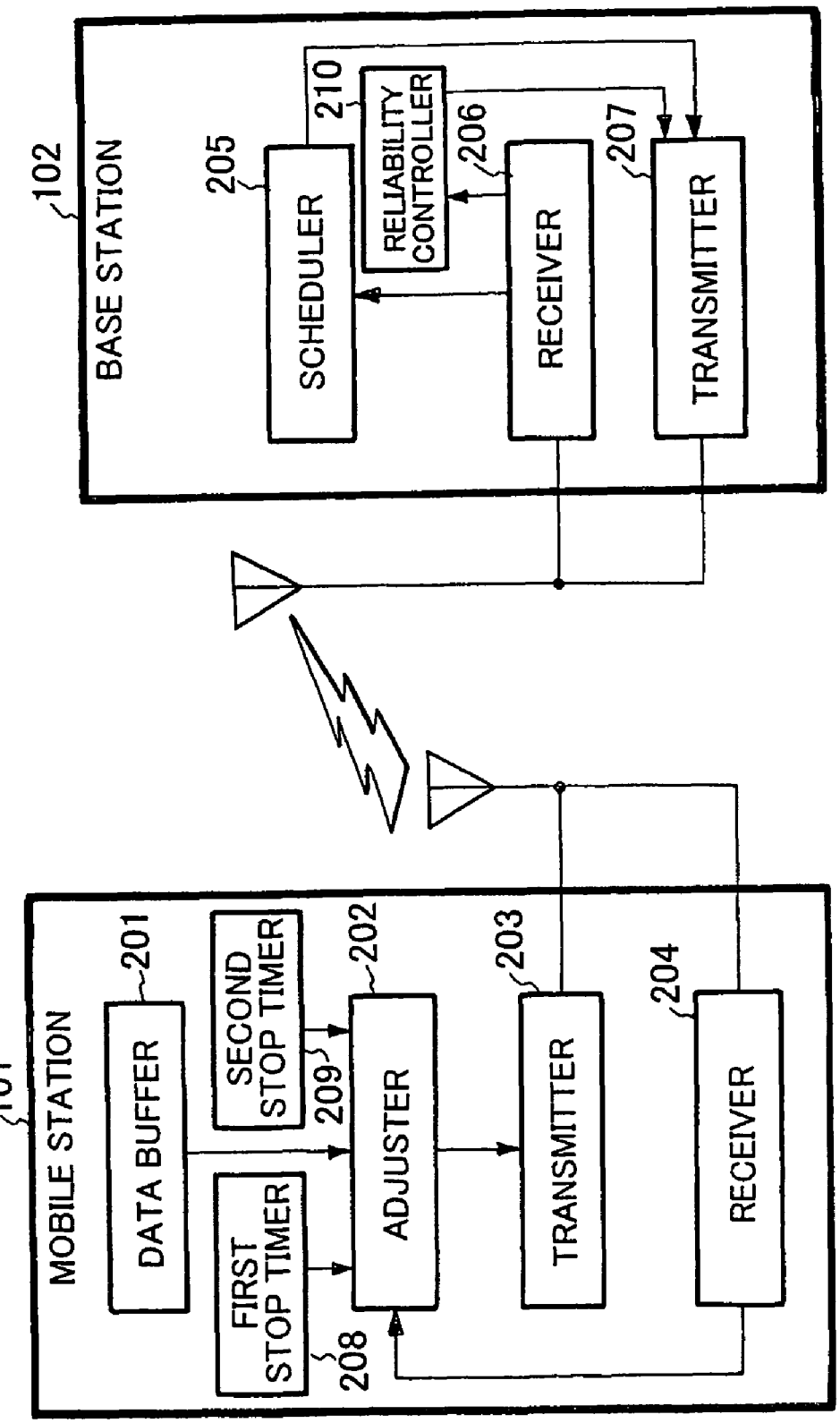
FIG. 8 is a block diagram showing the structure of a part of a mobile station and the structure of a part of the base station according to the third embodiment of the present invention.

FIG. 8 illustrates one of a plurality of mobile stations 101 and a base station 102 in a system comprising the plurality of mobile stations 101 which are connected to the base station 102 according to the third embodiment. Though, only one mobile station 101 is illustrated in FIG. 3, other similar mobile stations 101 not shown are also connected to the base station 102.

The difference between the structure of the base station 102 according to the first and third embodiments is that the reliability controller 210 is added. Other members in the base station 102 are identical.

Figure 1:
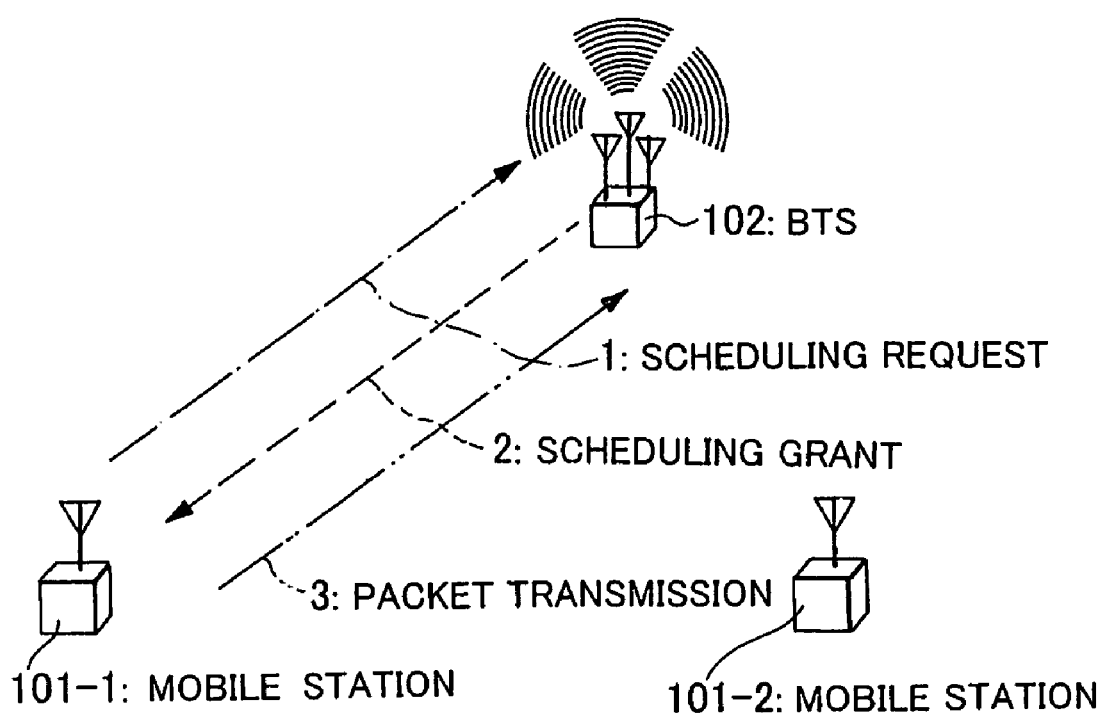
FIG. 1 illustrates the Enhanced Uplink Dedicated Channel (EUDCH) system.
Figure 2:
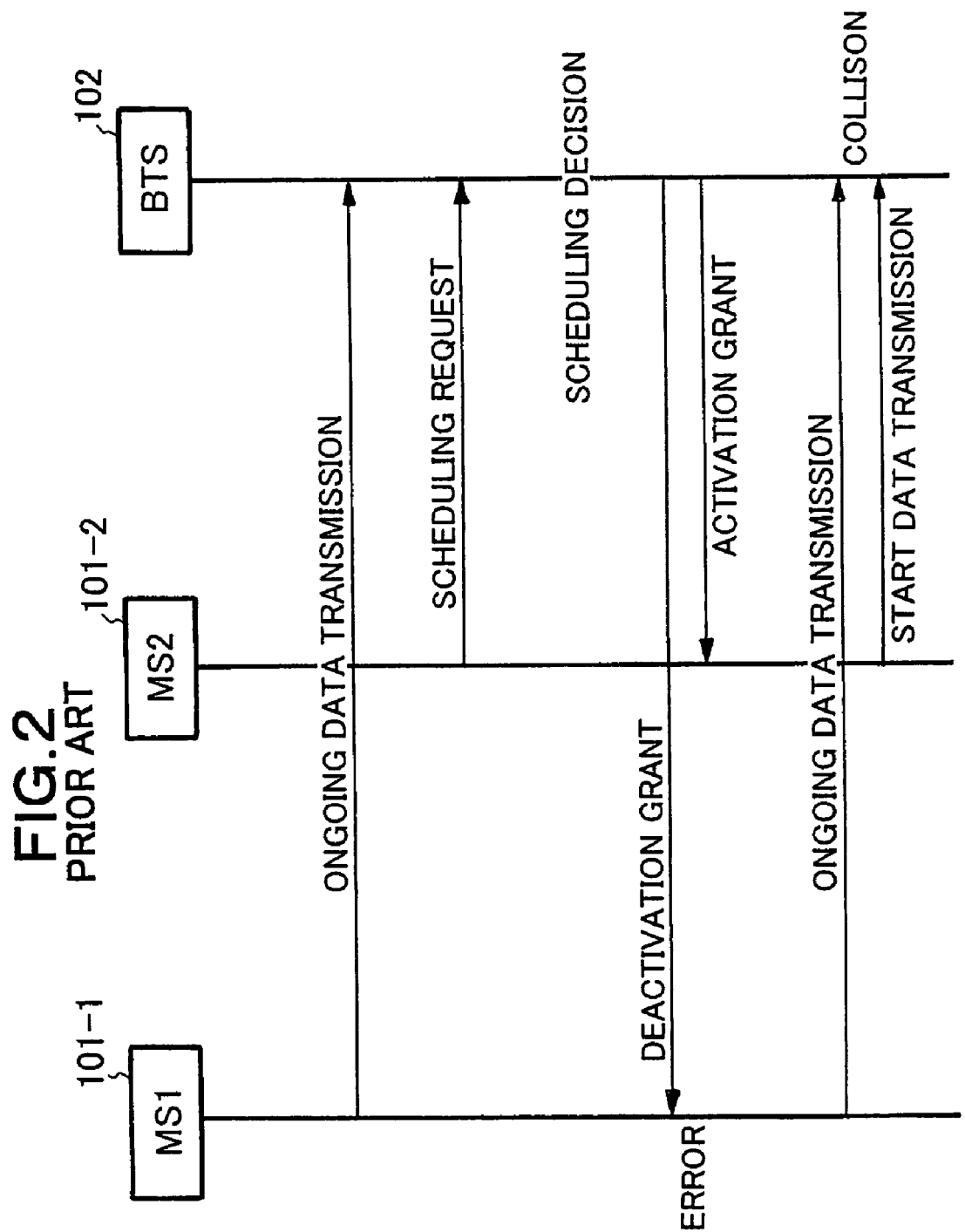
FIG. 2 is a sequence diagram showing a problem to be solved by the present invention.

The third embodiment differs from the aforementioned conventional technology (as shown in FIG. 2) in that the base station 102 controls one or more different reliability factors depending on whether it sends deactivation or activation scheduling grant message to the mobile station. The probability of successful reception of a scheduling grant message by a mobile station 101 is dependent on the reliability with which the message is sent. The reliability is dependent on the reliability factors, for example, as follows:

a transmission power of a scheduling grant message, a coding gain of a scheduling grant message (Here the coding gain refers to the error correction performance, i.e., the number of information bits/the number of coded bits. In other words, redundancy of an error correction code consisting of coded bits, i.e., consisting of the information bits and parity bits), the number of transmission antennas of a scheduling grant message, the number of repetitions of sending a scheduling grant message, Other ways to control the probability of successful reception of a scheduling grant message by the mobile station.

Under the same wireless channel environment, if at least one of the reliability factors is greater (for example, larger transmission power of a scheduling grant message), the scheduling grant message is sent with higher reliability in order to increasing the possibility that the scheduling grant message is successfully received by the mobile station 101.

Therefore, the base station 102 controls at least one of the reliability factors so that the reliability for the worse transmission environment is greater than the reliability for the better transmission environment.

Increasing the reliability factors are as follows:

a coding gain of a scheduling grant message is increased the number of transmission antennas of a scheduling grant message is increased.

the number of repetitions of sending a scheduling grant message is increased.

Other ways to increase the probability of successful reception of a scheduling grant message by the mobile station is executed.

Figure 9:
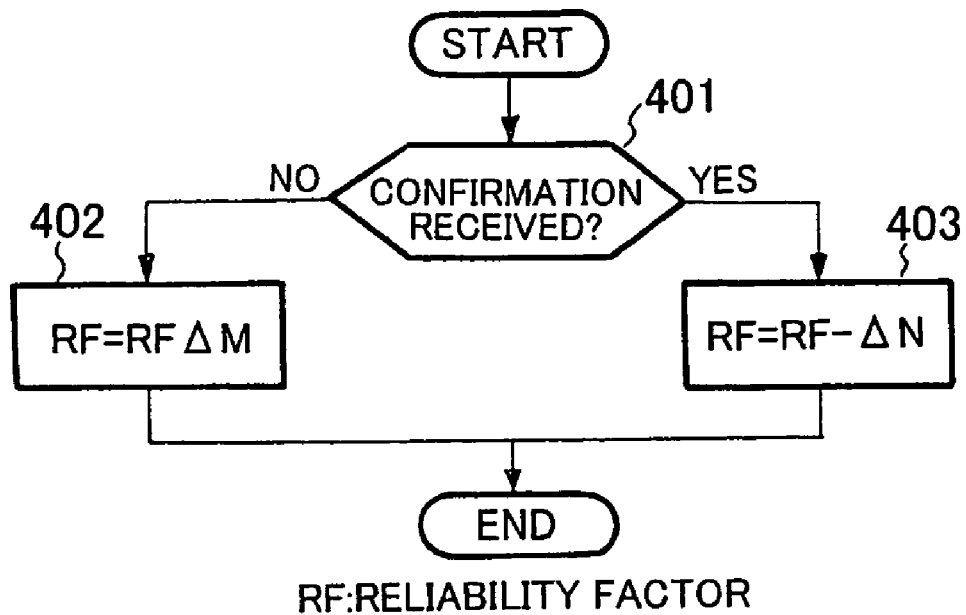
FIG. 9 is a flow diagram showing the operation of the base station according to the third embodiment of the present invention.

The third embodiment can be combined with any one of the first embodiment and the second embodiment. In the case where the third embodiment is combined with the first embodiment, the base station 102 can control at least one of the reliability factors depending on the successful reception of a scheduling grant confirmation message from the mobile station 101 as follows (see FIG. 9):

If the base station 102 cannot receive any scheduling grant confirmation message from the mobile station to be deactivated (401:NO), then the base station 102 increases at least one of the reliability factors for retransmission of the deactivation scheduling grant message by M delta portion (402).

If the base station 102 can receive any scheduling grant confirmation message from the deactivated mobile station to be deactivated (401:YES), then the base station 102 decreases one of the reliability factors by N delta portion (403).

The increased reliability factor will be used scheduling grant message for the same mobile station in the future.

The base station 102 uses the increased or decreased reliability factor when it sends scheduling messages. In this way, the base station 102 maintains a reliability factor for each mobile station separately from the other mobile stations.

Using always a high reliability factor is costly from the radio resource point of view. For example, higher transmission power of scheduling message consumes the scarce resource of base station transmission power. Using always a low reliability factor tend to cause the uplink packet collisions. Hence a trade-off parameter, i.e., the target return probability (TRP), can be defined as a target probability at which the base station successfully receives the scheduling grant confirmation from mobile station. The quality of transmission environment is reflected to TPR. Then the N and M delta portions are calculated based on TRP such that $$-N*(TRP)=M*(1-TRP)$$

Using the above equation, the reliability factor will converge to a level which satisfies the target return probability. When TRP is close to 0.9 (in other words, the base station wants to receive the scheduling grant confirmation message at 90%), the above equation can be rewritten as follows:

$$N*0.9=M*0.1$$

Hence if the M delta portion is 9 times larger than N delta portion, then the reliability factor will eventually converge to the TRP of 90%. To allow a faster convergence, a large M delta portion can be chosen. To allow slow but stable convergence, a small M delta portion can be chosen. Hence setting of M delta portion can be decided based on the speed and stability of convergence. Once M delta portion is decided, then N delta portion can be calculated using TRP as shown above.

In the case where the third embodiment is combined with the second embodiment, the base station 102 can not control any one of the reliability factors based on the TRP as defined above, because the base station 102 never receives the scheduling grant confirmation from mobile station 101. However, the base station 102 can control at least one of the reliability factors as follows:

The base station 102 detects the success or failure in the reception of a deactivation scheduling grant message by the mobile station 101 instead of the success or failure in the reception of the scheduling grant confirmation from the mobile station. The TRP in this case is redefined as a probability at which the mobile station successfully receives the deactivation scheduling grant message. The base station 102 can detect total failure in reception of the deactivation scheduling grant message by the mobile station 101 when detecting that packets still arrive at the base station 102 even after the deactivation time. In addition, the base station 102 can detect that there has been at least one success in the reception of the deactivation scheduling grant message by the mobile station 101 when detecting that no more packets arrive at the base station 102 after the deactivation time. Based on the measured probability of the success in the reception of the deactivation scheduling grant message by the mobile station, the base station 102 can control at least one of the reliability factors.

This applies to a case where the deactivation scheduling grant message is replaced by the activation scheduling grant message. In this case, the base station 102 can detect total failure in reception of the activation scheduling grant message by the mobile station 101 when detecting that no packets arrive at the base station 102 even after the activation time. In addition, the base station 102 can detect that there has been at least one success in the reception of the activation scheduling grant message by the mobile station 101 when detecting that packets arrive at the base station 102 after the activation time.

By updating the reliability in the way above, the reliability becomes higher when the transmission environment is worse than when the transmission environment is better, whereby the reliability compensates the transmission environment.

The reliability, and therefore, at least one of the reliability factors, should be higher for the deactivation scheduling grant message than for the activation scheduling grant message, because the failure in reception of the deactivation scheduling grant message results in the collision, which is more serious than decrease in the radio resource utilization which is a result of the failure in reception of the activation scheduling grant.

The reliability, and therefore, at least one of the reliability factors, should be higher for a scheduling grant message for more changing, i.e. increasing or decreasing, the amount of transmission than for a scheduling grant message for less changing the amount of transmission, because the failure of reception of the former scheduling grant message result in more deviation from the state desired by the base station 102 than that as a result of the failure of reception of the latter scheduling grant message.

Fourth Embodiment

The following describes a fourth embodiment of the present invention.

The aforementioned first to third embodiments are based on a packet scheduling system in which the base station 102 has only two types of scheduling grant message, i.e. activation and deactivation.

Figure 10:
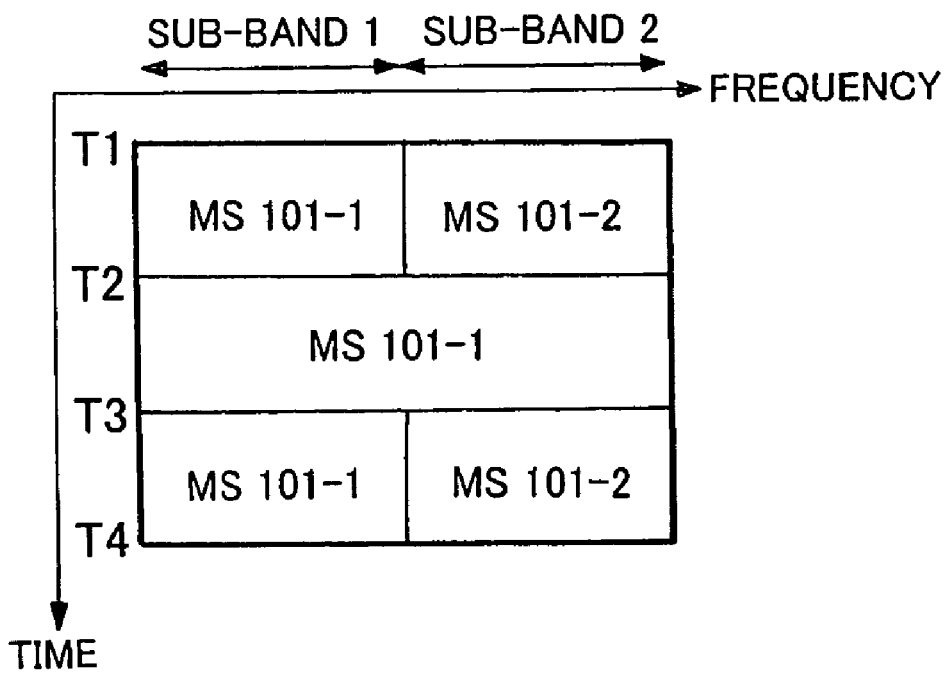
FIG. 10 is a diagram showing use of frequency bands and time periods by mobile stations in FTDMA system according to the fourth embodiment of the present invention.

In general, the base station 102 has more types of scheduling grant message such as (AH) activation of a mobile station with a high data rate,
(AL) activation of a mobile station with a low data rate,
(DH) deactivation of a mobile station transmitting at a high data rate,
(DL) deactivation of a mobile station transmitting at a low data rate,
(CLH) Change of a transmission rate of a mobile station from a low data rate to a high data rate,
(CHL) Change of a transmission rate of a mobile station from a high rate to a low data rate, An example of variable scheduling grant message is a frequency and time division multiplex access (FTDMA) based uplink packet transmission system as illustrated in FIG. 10. In FTDMA system, multiple mobile stations 101 are transmitting uplink data packets by exchanging scheduling request and grant message with the base station scheduler 205. The scheduling grant message includes the time and frequency information in which the mobile station 101 is allowed to transmit the data packets. For example, FIG. 10 illustrates the allowed frequency bandwidth of mobile station 101-1 can be flexibly changed by the base station scheduler.

Between time instances T1 and T2, the mobile station 101-1 is transmitting its data packets at sub-band 1 while the sub-band 2 is occupied by the mobile station 101-2.

Between time instances T2 and T3, the mobile station 101-2 is deactivated while the data rate of mobile station 101-1 is increased by use of both sub-band 1 and sub-band 2.

Between time instances T3 and T4, the data rate of mobile station 101-1 is decreased by reducing its transmission frequency band to sub-band 1 while mobile station 101-2 is activated with assigned frequency sub-band 2.

For the general types of scheduling grant message shown above, the aforementioned first embodiment can be extended such that:

for the cases of (DH) and (CHL), the mobile station 101 sends the scheduling grant confirmation message and performs the corresponding action, i.e., deactivation or rate-change, after pre-defined wait time for the cases of (AH) and (CLH), the mobile station 101 sends the scheduling grant confirmation message and performs the corresponding action, i.e. activation, or rate-change, after pre-defined wait time for the other cases, the mobile station 101 does not send the scheduling grant confirmation message and performs the corresponding action.

Using the above procedures, the reliability of transmission of critical scheduling grant message, e.g. the deactivation of high data rate mobile station, can be improved by scheduling grant confirmation message and predefined wait time. This will reduce or eliminate the loss of critical scheduling grant message of high data rate mobile station and hence reduce the undesired collision of data transmission in packet scheduling system.

Also the pre-defined action timing information, i.e., the activation time and the deactivation time, will allow the base station 102 to prepare for scheduling other mobile station while the mobile station to be deactivated is sending packets, thereby enabling full utilization of uplink radio resource.

For the general types of scheduling grant message described above, the aforementioned second embodiment can be extended as follows:

for the cases of (DH) and (CHL), the base station 102 repeats L times the transmission of a scheduling grant message and for the cases of (AH) and (CLH), the base station 102 repeats M times the transmission of a scheduling grant message and for the cases of (AL) and (DL), the base station 102 repeats N times the transmission of a scheduling grant message and the base station 102 sets L, M and L in such a way that L>M>N.

The criticalness of scheduling message is related to collision, use rate of transmission line or both of them, and tradeoff between them.

The criticalness is related to the collision of packet transmission among the mobile stations 101. If the failure of receiving a first scheduling grant message by a certain mobile station results in the collision more easily than the failure of receiving a second scheduling grant message by the certain or another mobile station, then the first scheduling grant message is more critical than the second scheduling grant message. For example, if the failure of receiving the (DH: deactivation of a mobile station transmitting at a high data rate, which occupies a large transmission power, a large frequency bandwidth and a large number of antennas) scheduling grant message by a certain mobile station results in more serious collision than the failure of receiving the (DL: deactivation of a mobile station transmitting at a low data rate, which occupies a smaller transmission power, a smaller frequency bandwidth and a smaller number of antennas) scheduling grant message by the certain or another mobile station, then the (DH) scheduling grant message is more critical than the (DL) scheduling grant message.

The criticalness is also related to the use rate of radio resource utilization. If the failure of receiving a first scheduling grant message by a certain mobile station results in the worse use rate than the failure of receiving a second scheduling grant message by the certain or another mobile station, then the first scheduling grant message is more critical than the second scheduling grant message. For example, if the failure of receiving the (AH: activation of a mobile station with a high data rate, which will occupy a large transmission power, a large frequency bandwidth and a large number of antennas) scheduling grant message by a certain mobile station results in the worse use rate than the failure of receiving the (AL: activation of a mobile station with a low data rate, which will occupy a small transmission power, a small frequency bandwidth and a small number of antennas) scheduling grant message by the certain or another mobile station, then the (AH) scheduling grant message is more critical than the (AL) scheduling grant message.

The intervals between the scheduling grant messages may dependent on L, M and N. For example, the intervals may be shorter if the number of the repetition is greater. However, it is also possible that the intervals are not dependent on L, M and N.

Using the above procedures, the most critical scheduling grant message, e.g. the deactivation of a high data rate mobile station, can be protected by the largest repetition factor. Then second critical scheduling grant messages, such as activation of a mobile station with high data rate, can be protected by the second largest repetition factor.

In the second embodiment, the deactivation scheduling grant message is sent L times if the message corresponds to (DH) and N times if the message corresponds to (DL). In addition, provided that the activation scheduling grant message is sent repeatedly, the message is sent M times if the message corresponds to (AH) and N times if the message corresponds to (AL).

The number of repetitions of sending a deactivation scheduling grant message is greater than the number of repetitions of sending an activation scheduling grant message. The number of repetitions of sending a scheduling grant message is one of the reliability factors as mentioned in the third embodiment. In addition, the number of repetitions of sending a scheduling grant message varies according to the criticalness as mentioned in this embodiment. Therefore, the reliability is dependent on the number of repetitions as one of the reliability factors, and the number of repetitions is dependent on the seriousness. If the seriousness is great, then the reliability should be great. In order to achieving this relation, not only increasing the number of repetitions, as mentioned above, but also, increasing other reliability factors as mentioned in the third embodiment is adopted.

The procedure of the mobile station 101, including that as shown in FIG. 4, can be realized by a hardware, a software or the combination of them.

The procedure of the base station 102, including that as shown in FIG. 5, can be realized by a hardware, a software or the combination of them.

What is claimed is:

1. A method for controlling a plurality of transmitters, at least one of which transmits packets to a receiver, said controlling being made by sending at least one message to said at least one of said plurality of transmitters from a controller, said method comprising the steps of:
   determining reliability of said message; and
   sending said message to a target transmitter with the determined reliability;
   wherein the step of determination is a first determination step of setting to a deactivation scheduling grant message reliability higher than reliability set to an activation scheduling grant message or a second determination step of setting to a rate-decrease scheduling grant message reliability higher than reliability set to a rate-increase scheduling grant message, and
   wherein if the step of determination is the first determination step, then said method further comprises the steps of:
   causing the step of sending said message in order to send a deactivation scheduling grant message directed to a first target transmitter from said controller;
   said first target transmitter receives said deactivation scheduling grant message;
   said first target transmitter sends a scheduling grant confirmation message to said controller after receiving said deactivation scheduling grant message;
   said first target transmitter halts transmitting packets when a first period elapses after receiving said deactivation scheduling grant message;
   said controller receives said scheduling grant confirmation message;
   causing the step of sending said message in order to send an activation scheduling grant message directed to a second target transmitter from said controller after said controller receives said scheduling grant confirmation message;
   said second target transmitter receives said activation scheduling grant message; and
   said second target transmitter starts to transmit packets when a second period elapses after receiving said activation scheduling grant message.

2. The method as set forth in claim 1,
   wherein if the step of determination is the second determination step, then in the second determination step, said reliability is determined depending on amount of increase or decrease of said data transmission rate.

3. The method as set forth in claim 1,
   wherein said reliability comprises at least one of factors including a code gain of said message, a number of transmission antennas of said message, and a number of repetitions of sending said message, and
   wherein in the step of determination, at least one of said factors is set greater for said message which should be sent with higher reliability than said one of said factors for said message which should be sent with lower reliability.

4. The method as set forth in claim 1, wherein in the step of determination, higher reliability is set to a scheduling grant message having higher seriousness than reliability set to an scheduling grant message having lower seriousness.

5. The method as set forth in claim 1, wherein if the step of determination is the second determination step, then the method further comprises the steps of:
causing the step of sending said message in order to send a rate-decrease scheduling grant message toward said target transmitter from said controller;
said target transmitter receives said rate-decrease scheduling grant message;
said target transmitter sends a scheduling grant confirmation message to said controller; and
said target transmitter decreases said data transmission rate when a period elapses after receiving said rate-decrease scheduling grant message.

6. The method as set forth in claim 1, wherein if the step of determination is the second determination step, then said method further comprises the steps of:
causing the step of sending said message in order to send a rate-increase scheduling grant message toward said target transmitter from said controller;
said target transmitter receives said rate-increase scheduling grant message; and
said target transmitter increases said data transmission rate when a period elapses after receiving said rate-increase scheduling grant message.

7. The method as set forth in claim 1, wherein if the step of determination is the second determination step, then said method further comprises the steps of:
causing the step of sending said message in order to send a rate-increase scheduling grant message toward said target transmitter from said controller;
said target transmitter receives said rate-increase scheduling grant message; and
said target transmitter increases said data transmission rate just after receiving said rate-increase scheduling grant message.

8. The method as set forth in claim 1, wherein a deactivation time when said first target transmitter halts transmitting packets is the same as an activation time when said second target transmitter starts to transmit packets.

9. The method as set forth in claim 8, wherein if the step of determination is the first determination step, then further comprises the steps of:
attaching information representing said first period corresponding to said deactivation time to said deactivation scheduling grant message; and
attaching information representing said second period corresponding to said activation time to said activation scheduling grant message.

10. The method as set forth in claim 9, wherein if the step of determination is the first determination step and said first period is predetermined, then further comprises the step of:
calculating the second period based on the transmission time of said deactivation scheduling grant message which is successfully received by said first target transmitter, said first period, and the transmission time of said activation time.

11. The method as set forth in claim 1, wherein if the step of determination is the first determination step, then further comprises the steps of:
repeating the step of causing the step of sending said message in order to send a deactivation scheduling grant message directed to said first target transmitter from said controller until said controller receives said scheduling grant confirmation message.

12. The method as set forth in claim 1, wherein
the method is applied to a cellular mobile communication network,
each of said plurality of transmitters is included in each of a plurality of mobile stations in said cellular mobile communication network, and
said receiver and said controller are included in a base station in said cellular mobile communication network.

13. The method as set forth in claim 1, wherein upon receipt of the deactivation scheduling grant message, a stop timer is changed from a deactivated state to an active state and starts counting up from zero to a deactivation time, at which point in time the stop timer is changed to back to the deactivated state.

14. A method for controlling a plurality of transmitters, at least one of which transmits packets to a receiver, said controlling being made by sending at least one message to said at least one of said plurality of transmitters from a controller, said method comprising the steps of:
determining reliability of said message; and
sending said message to a target transmitter with the determined reliability;
wherein the step of determination is a first determination step of setting to a deactivation scheduling grant message reliability higher than reliability set to an activation scheduling grant message or a second determination step of setting to a rate-decrease scheduling grant message reliability higher than reliability set to a rate-increase scheduling grant message, and
wherein if the step of determination is the first determination step,
then said method further comprises the steps of:
repeatedly causing the step of sending said message in order to send a deactivation scheduling grant message directed to a first target transmitter from said controller;
said first target transmitter receives at least one of the deactivation scheduling grant messages;
said first target transmitter halts transmitting packets when a first period elapses after receiving said one of the deactivation scheduling grant messages;
causing the step of sending said message in order to send an activation scheduling grant message directed to a second target transmitter from said controller;
said second target transmitter receives said activation scheduling grant message; and
said second target transmitter starts to transmit packets when a second period elapses after receiving said activation scheduling grant message.

15. The method as set forth in claim 14, wherein a deactivation time when said first target transmitter halts transmitting packets is the same as an activation time when said second target transmitter starts to transmit packets.

16. The method as set forth in claim 15, wherein if the step of determination is the first determination step, then further comprises the steps of:

attaching information representing said first period corresponding to said deactivation time to said deactivation scheduling grant message; and attaching information representing said second period corresponding to said activation time to said activation scheduling grant message.

17. The method as set forth in claim 16, wherein if the step of determination is the first determination step and said deactivation time is predetermined, then further comprises the step of:

calculating the first period for each of the deactivation scheduling grant messages based on the transmission time of each of the deactivation scheduling grant messages and said deactivation time.

18. The method as set forth in claim 14, wherein the step of causing the step of sending said message in order to send an activation scheduling grant message directed to a second target transmitter from said controller is executed repeatedly.

19. The method as set forth in claim 18, wherein a number of occurrences of causing the step of sending said message in order to send the deactivation scheduling grant message directed to the first target transmitter from said controller is greater than a number of occurrences of causing the step of sending said message in order to send the activation scheduling grant message directed to the second target transmitter from said controller.

20. The method as set forth in claim 14, wherein if the step of determination is the second determination step, then in the second determination step, said reliability is determined depending on amount of increase or decrease of said data transmission rate.

21. The method as set forth in claim 14, wherein said reliability comprises at least one of factors including a code gain of said message, a number of transmission antennas of said message, and a number of repetitions of sending said message, and wherein in the step of determination, at least one of said factors is set greater for said message which should be sent with higher reliability than said one of said factors for said message which should be sent with lower reliability.

22. The method as set forth in claim 14, wherein in the step of determination, higher reliability is set to a scheduling grant message having higher seriousness than reliability set to a scheduling grant message having lower seriousness.

23. The method as set forth in claim 14, wherein if the step of determination is the second determination step, then said method further comprises the steps of:

causing the step of sending said message in order to send a rate-decrease scheduling grant message toward said target transmitter from said controller;

said target transmitter receives said rate-decrease scheduling grant message;

said target transmitter sends a scheduling grant confirmation message to said controller; and said target transmitter decreases said data transmission rate when a period elapses after receiving said rate-decrease scheduling grant message.

24. The method as set forth in claim 14, wherein if the step of determination is the second determination step, then said method further comprises the steps of:

causing the step of sending said message in order to send a rate-increase scheduling grant message toward said target transmitter from said controller;

said target transmitter receives said rate-increase scheduling grant message; and said target transmitter increases said data transmission rate when a period elapses after receiving said rate-increase scheduling grant message.

25. The method as set forth in claim 14, wherein if the step of determination is the second determination step, then said method further comprises the steps of:

causing the step of sending said message in order to send a rate-increase scheduling grant message toward said target transmitter from said controller;

said target transmitter receives said rate-increase scheduling grant message; and said target transmitter increases said data transmission rate just after receiving said rate-increase scheduling grant message.

26. The method as set forth in claim 14, wherein the method is applied to a cellular mobile communication network, each of said plurality of transmitters is included in each of a plurality of mobile stations in said cellular mobile communication network, and said receiver and said controller are included in a base station in said cellular mobile communication network.

27. The method as set forth in claim 14, wherein upon receipt of the deactivation scheduling grant message, a stop timer is changed from a deactivated state to an active state and starts counting up from zero to a deactivation time, at which point in time the stop timer is changed to back to the deactivated state.

28. A system for controlling a plurality of transmitters, at least one of which transmits packets to a receiver, said controlling being made by sending at least one message to said at least one of said plurality of transmitters from a controller, said system comprising:

means for determining reliability of said message; and means for sending said message to a target transmitter with the determined reliability;

wherein the means for determining is a first determining means for setting to a deactivation scheduling grant message reliability higher than reliability set to an activation scheduling grant message or a second determining means for setting to a rate-decrease scheduling grant message reliability higher than reliability set to a rate-increase scheduling grant message, wherein if the means for determining is the first determining means, then said system is characterized in that the means for sending said message sends a deactivation scheduling grant message directed to a first target transmitter from said controller, that said first target transmitter comprises:

means for receiving said deactivation scheduling grant message;

means for sending a scheduling grant confirmation message to said controller after receiving said deactivation scheduling grant message; and means for halting transmitting packets when a first period elapses after receiving said deactivation scheduling grant message, that said controller comprises:

means for receiving said scheduling grant confirmation message, that the means for sending said message sends an activation scheduling grant message directed to a second target transmitter from said controller after said controller receives said scheduling grant confirmation message, and that said second target transmitter comprises:

means for receiving said activation scheduling grant message; and means for starting to transmit packets when a second period elapses after receiving said activation scheduling grant message.

29. The system as set forth in claim 28, wherein if the means for determining is said second determining means, then the means for determining determines said reliability depending on amount of increase or decrease of said data transmission rate.

30. The system as set forth in claim 28, wherein said reliability comprises at least one of factors including a code gain of said message, a number of transmission antennas of said message, and a number of repetitions of sending said message, and wherein the means for determining, at least one of said factors is set greater for said message which should be sent with higher reliability than said one of said factors for said message which should be sent with lower reliability.

31. The system as set forth in claim 28, wherein the means for determining sets higher reliability to a scheduling grant message having higher seriousness than reliability set to an scheduling grant message having lower seriousness.

32. The system as set forth in claim 28, wherein if the means for determining is the second determining means, then said system is characterized in that the means for sending said message sends a rate-decrease scheduling grant message toward said target transmitter from said controller, and that said target transmitter comprises:

means for receiving said rate-decrease scheduling grant message;

means for sending a scheduling grant confirmation message to said controller; and means for decreasing said data transmission rate when a period elapses after receiving said rate-decrease scheduling grant message.

33. The system as set forth in claim 28, wherein if the means for determining is the second determining means, then said system is characterized in that the means for sending said message sends a rate-increase scheduling grant message toward said target transmitter from said controller, and that said target transmitter comprises:

means for receiving said rate-increase scheduling grant message; and means for increasing said data transmission rate when a period elapses after receiving said rate-increase scheduling grant message.

34. The system as set forth in claim 28, wherein if the means for determining is the second determining means, then said system is characterized in that the means for sending said message sends a rate-increase scheduling grant message toward said target transmitter from said controller, and that said target transmitter comprises:

means for receiving said rate-increase scheduling grant message; and means for increasing said data transmission rate just after receiving said rate-increase scheduling grant message.

35. The system as set forth in claim 28, wherein a deactivation time when said first target transmitter halts transmitting packets is the same as an activation time when said second target transmitter starts to transmit packets.

36. The system as set forth in claim 35, wherein if the means for determining is the first determining means, then said controller further comprises:

means for attaching information representing said first period corresponding to said deactivation time to said deactivation scheduling grant message; and means for attaching information representing said second period corresponding to said activation time to said activation scheduling grant message.

37. The system as set forth in claim 36, wherein if the means for determining is the first determining means and said first period is predetermined, then said controller further comprises: means for calculating the second period based on the transmission time of said deactivation scheduling grant message which is successfully received by said first target transmitter, said first period, and the transmission time of said activation time.

38. The system as set forth in claim 28, wherein if the means for determining is the first determining means, then the means for sending said message repeatedly sends said deactivation scheduling grant message directed to a first target transmitter from said controller until said controller receives said scheduling grant confirmation message.

39. The system as set forth in claim 28, wherein the system is applied to a cellular mobile communication network, each of said plurality of transmitters is included in each of a plurality of mobile stations in said cellular mobile communication network, and said receiver and said controller are included in a base station in said cellular mobile communication network.

40. A system for controlling a plurality of transmitters, at least one of which transmits packets to a receiver, said controlling being made by sending at least one message to said at least one of said plurality of transmitters from a controller, said system comprising:

means for determining reliability of said message; and means for sending said message to a target transmitter with the determined reliability;

wherein the means for determining is a first determining means for setting to a deactivation scheduling grant message reliability higher than reliability set to an activation scheduling grant message or a second determining means for setting to a rate-decrease scheduling grant message reliability higher than reliability set to a rate-increase scheduling grant message, wherein if the means for determining is the first determining means, then said system is characterized in that the means for sending said message repeatedly sends a deactivation scheduling grant message directed to a first target transmitter from said controller, that said first target transmitter comprises:

means for receiving at least one of the deactivation scheduling grant messages; and means for halting transmitting packets when a first period elapses after receiving said one of the deactivation scheduling grant messages, that the means for sending said message sends an activation scheduling grant message directed to a second target transmitter from said controller, and that said second target transmitter comprises:

means for receiving said activation scheduling grant message; and means for starting to transmit packets when a second period elapses after receiving said activation scheduling grant message.

41. The system as set forth in claim 40, wherein a deactivation time when said first target transmitter halts transmitting packets is the same as an activation time when said second target transmitter starts to transmit packets.

42. The system as set forth in claim 41, if the means for determining is the first determining means, then said controller further comprises:

means for attaching information representing said first period corresponding to said deactivation time to said deactivation scheduling grant message; and means for attaching information representing said second period corresponding to said activation time to said activation scheduling grant message.

43. The system as set forth in claim 42, wherein if the means for determining is the first determining means, and said deactivation time is predetermined, then said controller further comprises means for calculating the first period for each of the deactivation scheduling grant messages based on the transmission time of each of the deactivation scheduling grant messages and said deactivation time.

44. The system as set forth in claim 40, wherein the means for sending said message repeatedly sends an activation scheduling grant message directed to a second target transmitter from said controller.

45. The system as set forth in claim 44, wherein a number of occurrences that the means for sending said message sends the deactivation scheduling grant message directed to the first target transmitter from said controller is greater than a number of occurrences that the means for sending said message sends the activation scheduling grant message directed to the second target transmitter from said controller.

46. The system as set forth in claim 40, wherein if the means for determining is said second determining means, then the means for determining determines said reliability depending on amount of increase or decrease of said data transmission rate.

47. The system as set forth in claim 40, wherein said reliability comprises at least one of factors including a code gain of said message, a number of transmission antennas of said message, and a number of repetitions of sending said message, and wherein the means for determining, at least one of said factors is set greater for said message which should be sent with higher reliability than said one of said factors for said message which should be sent with lower reliability.

48. The system as set forth in claim 40, wherein the means for determining sets higher reliability to a scheduling grant message having higher seriousness than reliability set to an scheduling grant message having lower seriousness.

49. The system as set forth in claim 40, wherein if the means for determining is the second determining means, then said system is characterized in that the means for sending said message sends a rate-decrease scheduling grant message toward said target transmitter from said controller, and that said target transmitter comprises:

means for receiving said rate-decrease scheduling grant message;

means for sending a scheduling grant confirmation message to said controller; and means for decreasing said data transmission rate when a period elapses after receiving said rate-decrease scheduling grant message.

50. The system as set forth in claim 40, wherein if the means for determining is the second determining means, then said system is characterized in that the means for sending said message sends a rate-increase scheduling grant message toward said target transmitter from said controller, and that said target transmitter comprises:

means for receiving said rate-increase scheduling grant message; and means for increasing said data transmission rate when a period elapses after receiving said rate-increase scheduling grant message.

51. The system as set forth in claim 40, wherein if the means for determining is the second determining means, then said system is characterized in that the means for sending said message sends a rate-increase scheduling grant message toward said target transmitter from said controller, and that said target transmitter comprises:

means for receiving said rate-increase scheduling grant message; and means for increasing said data transmission rate just after receiving said rate-increase scheduling grant message.

52. The system as set forth in claim 40, wherein the system is applied to a cellular mobile communication network, each of said plurality of transmitters is included in each of a plurality of mobile stations in said cellular mobile communication network, and said receiver and said controller are included in a base station in said cellular mobile communication network.

53. The computer program for having a computer execute the method as set forth in claim 1.

54. A computer readable storage medium storing a computer program, which when executed, causes a computer to execute the method as set forth in claim 14.

* * * * *